July 19, 1955 R. W. SONNENFELDT 2,713,608

COLOR TELEVISION SYNCHRONIZING SIGNAL SEPARATOR

Filed July 1, 1953

INVENTOR.
Richard W. Sonnenfeldt

BY W. H. Sprouagle
ATTORNEY 2,713,608

COLOR TELEVISION SYNCHRONIZING SIGNAL SEPARATOR

Richard W. Sonnenfeldt, Haddonfield, N. J., assignor to Radio Corporation of America, a corporation of Delaware Application July 1, 1953, Serial No. 365,380

6 Claims. (Cl. 178—5.4)

This invention relates to television receiver operation and particularly to the separation of the color synchronizing signal component from a composite television signal.

The usual composite television signal includes not only a video signal component but also a synchronizing signal component by means of which raster scanning at the receiver is maintained in synchronism with the transmitter raster scanning. Additionally, in the type of color television system which operates in accordance with the signal specifications proposed by the National Television System Committee (NTSC) on February 2, 1953, a color synchronizing signal also is transmitted as part of the composite television signal. In such a system, the color synchronizing signal is a burst of several cycles of a color subcarrier wave frequency occurring in the so-called back porch region of the horizontal synchronizing waveforms. The raster scanning synchronizing signals may be separated from the video signal component of the composite television signal and from one another in a conventional manner such as generally done in black and white television practice. A representative form of apparatus suitable for this purpose is disclosed in U. S. Patent No. 2,207,775 granted July 16, 1940, to A. V. Bedford. In addition, it is necessary to separate the burst of subcarrier wave frequency from the composite television signal so that it may be compared in phase with a locally generated wave having the nominal subcarrier wave frequency.

The color synchronizing signal burst previously has been separated from the composite television signal in several ways, a typical one of which is disclosed in a publication titled, "Recent Developments in Color Synchronization in the RCA Color Television System" by Radio Corporation of America, February 1950. Figure 9 of this publication pertains especially to the receiver apparatus in which the burst separation is effected. The burst type of color television synchronizing system also is disclosed in another form in a paper titled "NTSC Color-TV Synchronizing Signal" by R. B. Dome published in "Electronics," vol. 25, page 96, February 1952. Burst color synchronizing in general is covered in a copending application of A. V. Bedford, Ser. No. 143,800, filed February 11, 1950 and titled "Snychronizing Apparatus."

In any system for effecting burst separation from a composite color television signal, it is desirable to achieve a maximum of noise immunity in order that the automatic frequency control of the local reference frequency oscillator be made as accurate as possible. Accordingly, one generally used device for effecting noise immune burst separation is gating apparatus. In using such apparatus, it is desirable to effect a maximum suppression of any transients which occur as a result of the gating operation. At the same time, it is desirable to achieve these results without the use of complicated apparatus.

Accordingly, it is an object of the present invention to provide apparatus for separating synchronizing signals from a composite television signal in a relatively simple and improved manner with a relatively high degree of noise immunity and with a maximum degree of transient suppression.

Another object of the invention is to provide a relatively simple apparatus for effecting burst separation and amplification with a minimum of transient effects from the separation operation.

In accordance with the present invention, there is provided a normally inoperative burst gating electron tube and a normally inoperative gate pulse injector tube. The composite signal is impressed upon the input circuit of the gating tube and gate pulses, which are coincident with the subcarrier wave bursts, are impressed upon the input circuit of the injector tube. As a consequence, the injector tube is periodically rendered operative to develop control voltages in its output circuit. The output circuit of the injector tube is coupled to the output circuit of the gating tube so as to supply it with operating voltage whereby to effect the development in the output circuit of the gating tube of subcarrier wave bursts superimposed upon pedestals corresponding to the gate pulses. The apparatus also includes an amplitude discriminating means coupled to the output of the gating tube for segregating the subcarrier wave bursts from the pedestals.

In one particular embodiment of the invention, the amplitude discriminating means includes the gate pulse injector tube, in the anode circuit of which the segregated bursts are developed. In another illustrative embodiment of the invention, the amplitude discriminating means includes another electron tube coupled to the output circuit of the burst gating tube.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

Figures 1, 2, 3:
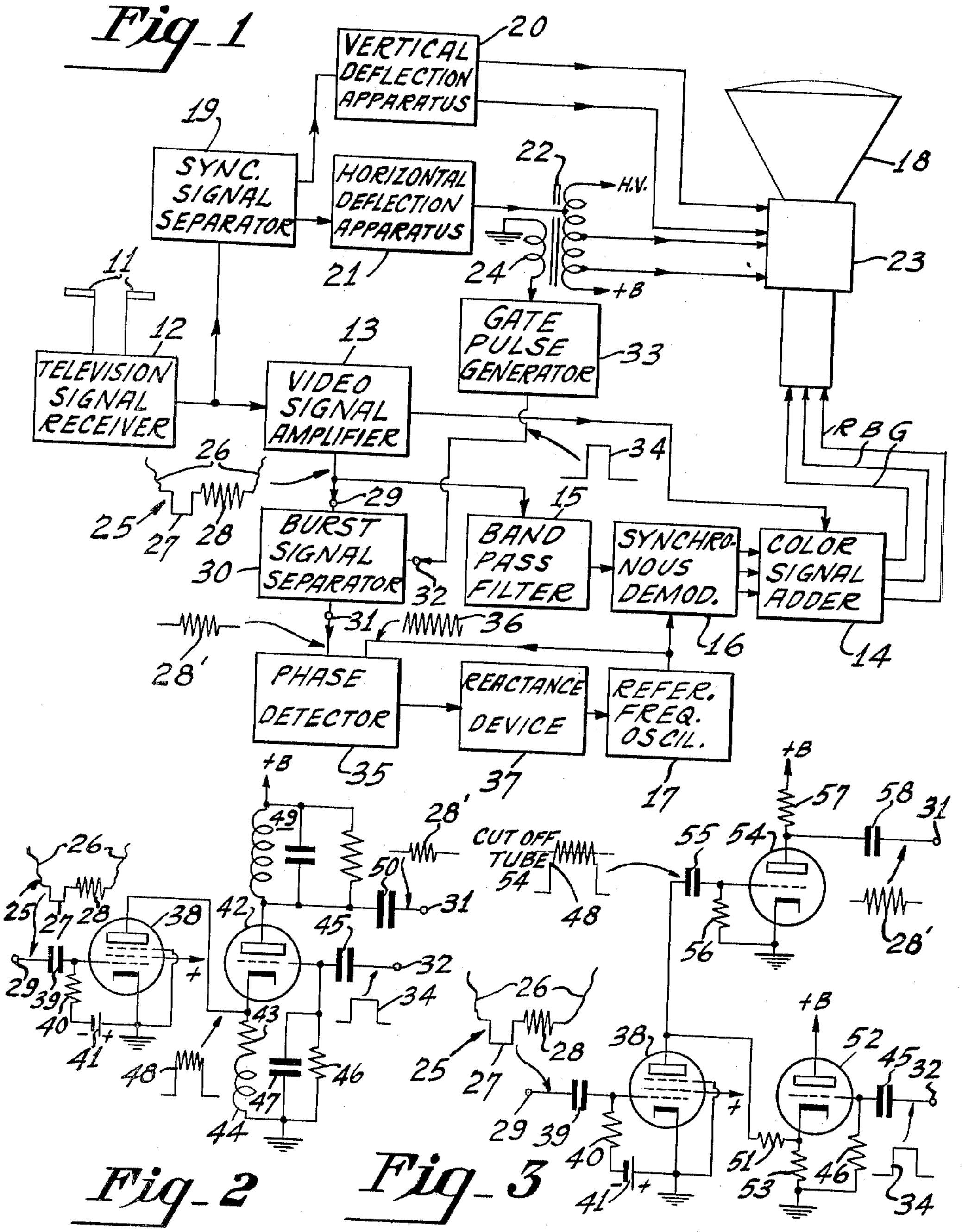
Figure 1 is a representation of a color television signal receiver mostly in block diagram form showing the general arrangement of apparatus embodying the present invention in such a receiver.
Figure 2 is a schematic circuit diagram of one form of the invention in which the gate pulse injector tube also is included in the amplitude discriminating means; and, Fig. 3 is another schematic circuit diagram showing another form of the invention in which a separate electron tube coupled to the output of the gating tube is included in the amplitude discriminating means.

In order to afford a suitable background for a better understanding of this invention, a brief reference to the general type of color television system with which it may be employed will first be given. In this type of color television system in accordance with the signal specifications presently proposed by NTSC, a brightness or luminance signal having the general character of a conventional black and white television signal is transmitted together with a phase- and amplitude-modulated subcarrier wave having a nominal frequency which corresponds to one of the higher luminance signal frequencies. The composite television signal, which includes such a video signal component, also includes the usual raster-scanning synchronizing signals and, in addition, the burst of color subcarrier wave frequency as described. The subcarrier wave bursts follow in time the horizontal sync signal pulses in the back porch region and are essentially symmetrical above and below the amplitude representing black level of the video signals.

The color information which is transmitted as phase and amplitude modulations of the subcarrier wave is, in effect, one or more so-called "color difference" signals. The brightness or luminance signal is made up of predetermined portions of the red, green and blue color representative signals, for example, and a "color difference" signal is one which, when added to the luminance signal, forms a complete color representative signal which may be used for color reproducing purposes.

In Figure 1, to which reference now will be made, there are shown the essential components of a receiver for a composite television signal such as that described in accordance with the presently proposed NTSC signal specifications. This apparatus includes an antenna 11 which is coupled to a television signal receiver 12. This television signal receiver may be entirely conventional including, for example, RF and IF amplifiers, a frequency converter or first detector, and a signal or second detector. It, therefore, will be understood that there is derived at the output of the receiver 12 a composite television signal which is in accordance with the presently proposed NTSC standards. Accordingly, this signal includes a brightness or luminance signal component covering a band of frequencies of approximately 4 megacycles and is made up of predetermined percentages of the red, green and blue color representative signals derived from a subject. In addition to the luminance signal component, the video signal component also includes a chrominance signal component consisting of a phase- and amplitude-modulated color subcarrier wave having a nominal frequency of approximately 3.58 megacycles. Additionally, the composite signal developed in the output of the receiver 12 includes the usual horizontal and vertical synchronizing signals. Finally, the composite signal also includes the bursts of the color subcarrier wave frequency in the back porch region of the horizontal synchronizing signal waveforms.

The composite color television signal developed in the output of the receiver 12 is impressed upon a video signal amplifier 13. It will be understood that this amplifier preferably includes a number of stages. The final stage of the video signal amplifier 13 is coupled to a color signal adder, or combining apparatus 14, the operation of which will be more fully described subsequently. The composite color television signal which also may be derived from the final stage of the video signal amplifier 13 as described, or from an earlier stage, if desired, such as indicated in the drawing, also is impressed upon a band-pass filter 15. It will be understood that this filter generally is designed to pass frequencies within a band of from 2–4 megacycles. It is within this band of frequencies that the color subcarrier wave and its sidebands lie.

The band-pass filter 15 is coupled to a synchronous demodulator 16. It will be understood that usually the synchronous demodulator comprises a plurality of demodulating components of the synchronous type in each of which the color subcarrier wave, together with its sidebands, are mixed with a predetermined phase of a reference frequency wave having a frequency corresponding to the nominal color subcarrier wave frequency. Such a reference frequency wave may be derived from a reference frequency oscillator 17 which will be understood to be of a character capable of operation with good stability at a frequency of approximately 3.58 megacycles. Also, it will be understood that there is derived from the oscillator, or from auxiliary apparatus employed therewith, different phases of the reference frequency wave for impression upon the different synchronous demodulating components of the synchronous demodulator 16.

The particular details of the synchronous demodulating apparatus and of the reference frequency wave phases for use therewith will not be described in any further detail because such information is not necessary for a complete understanding of the invention and, furthermore, because such information is generally known to those familiar with color television systems operating in accordance with the presently proposed NTSC standards. So far as the present invention is concerned, it is immaterial whether the synchronous demodulator 16 includes two demodulating components, as in the present practice, or three, as in a prior arrangement. Neither is it of any consequence so far as the invention is concerned whether the color difference signals are derived directly from the demodulating apparatus as in prior practice, or from matrixing apparatus which converts the demodulated chrominance signals into the desired color difference form in accordance with the present practice.

Accordingly, it will be understood that the red, blue and green color difference signals derived from the synchronous demodulator 16, and/or any auxiliary matrixing apparatus which may be used in conjunction therewith, are impressed respectively upon the color signal adder 14. The color signal adder in fact may comprise three similar components for each of the color signals. The luminance signal derived from the video signal amplifier 13 is impressed upon all of the components of the color signal adder. The color difference signals derived from the synchronous demodulator 16 are impressed respectively upon the components of the color signal adder. By means of such apparatus, the various color difference signals are added algebraically to the luminance signal so as to produce red, blue and green color representative signals in the output circuits of the color signal adder 14.

The red, blue and green color representative signals derived from the color signal adder 14 are impressed upon the electron beam controlling apparatus of an image-reproducing device in the form of a tri-color kinescope 18. In the present instance, it will be assumed that the tri-color kinescope is of the same general type as that described in a paper of H. B. Law titled "A Three-Gun Shadow-Mask Color Kinescope" published in the Proceedings of the I. R. E., vol. 39, N. 10, October 1951 at page 1186. Such a color kinescope also forms the subject matter of U. S. Patent No. 2,595,548 granted May 6, 1952 to A. C. Schroeder and titled "Picture Reproducing Apparatus." Such a kinescope includes three electron guns or their equivalents by which to produce three different electron beams which, upon impingement of a luminescent screen, effect the production of red, green and blue light, respectively. Accordingly, the red color signal produced in the output of the color signal adder 14 is impressed upon a suitable electrode of the red electron beam producing apparatus of the tri-color kinescope 18. In a similar manner, the blue and green color signals produced in the output of the color signal adder 14 are coupled respectively to the blue and green electron beam producing apparatus of the tri-color kinescope.

The color television system embodying the present invention also is provided with a generally conventional apparatus for controlling the deflection of the electron beam components of the tri-color kinescope 18 so as to scan the usual substantially rectangular raster at the luminescent screen thereof. For the purpose of the control of such apparatus, the composite color television signal produced in the output of the television signal receiver 12 also is impressed upon a sync signal separator 19. As previously indicated, the sync signal separator may be of the same general type as that disclosed in the Bedford patent, 2,207,775. Such apparatus functions to separate the horizontal and vertical synchronizing signals from one another and also from the video signal component of the composite signal. The separated vertical sync pulses are impressed upon vertical deflection apparatus 20 which functions in a conventional manner to produce a substantially sawtooth wave at vertical or field deflection frequency. In a somewhat similar manner, the separated horizontal sync pulses are impressed upon horizontal deflection apparatus 21 for the production of a substantially sawtooth wave at horizontal or line deflection frequency.

The horizontal deflection wave is impressed upon an output transformer 22. It will be understood that the vertical deflection output circuit may also include a similar output transformer. The vertical and horizontal frequency sawtooth waves are impressed upon respective windings of a deflection yoke 23 with which the tricolor kinescope 18 is provided. By such means, the raster scanning deflection of the electron beam components is effected.

The horizontal deflection output transformer 22 also includes an auxiliary winding 24. This winding functions to develop flyback pulses of any desired polarity during the retrace periods of the horizontal deflection system. As is well understood, the horizontal retrace period is initiated by the horizontal sync pulses and includes the time during which the color synchronizing signal bursts are received. The retrace or flyback pulses developed in the transformer winding 24 are employed in accordance with the invention, to effect the separation of the color synchronizing signal bursts from the composite television signal in a manner to be described.

Before describing in detail the apparatus for separating the color synchronizing bursts from the composite color television signal in accordance with the invention, the manner in which the phase and frequency control of the oscillator 17 is achieved by means of these color synchronizing signal bursts will be described. As previously indicated, the composite television signal 25, which is derived from the video signal amplifier 13, comprises a video signal component 26 which, as described, also includes the modulated color subcarrier wave. A horizontal sync pulse 27 also is part of the composite signal 25. Finally, the color synchronizing signal burst 28 appearing in the back porch region of the horizontal synchronizing waveform also is part of the composite television signal 25. Such a composite signal is impressed upon an input terminal 29 of a burst signal separator 30. As will be described more fully hereinafter, the burst signal separator includes a gating tube which normally is inoperative so that the burst 28 is not transferred to the output terminal 31 of the separator. The burst signal separator 30 also is provided with a control terminal 32 which is coupled to the output of a gate pulse generator 33. The gate pulse generator may be any conventional device which is susceptible of control by the flyback pulses derived from the horizontal output transformer winding 24 for the production of gate pulses 34 having the desired width and timing so as to achieve coincidence with the burst signal periods. One such device which may be employed for this purpose is a mono-stable multivibrator such as the one disclosed in a book titled, "Waveforms" published by McGraw-Hill Book Co., Inc. New York, N. Y., in Figure 5–10 at page 168.

The impression of the gate pulses upon the control terminal 32 of the burst signal separator 30 momentarily operates this latter apparatus periodically for the transfer of the burst 28 to the output terminal 31.

The separated burst 28′ developed at the output terminal 31 of the burst signal separator 30 is impressed upon one input circuit of a phase detector 35. The reference frequency wave 36 derived from the oscillator 17 in the phase which nominally corresponds to the phase of the received synchronizing bursts is impressed upon another input circuit of the phase detector. The reference frequency wave 36 thus is compared in phase with the separated burst 28′. Any difference in phase between these two waves is detected and effects the development in the output of the phase detector 35 of an error voltage which is representative of the sense and magnitude of the phase deviation.

The phase error voltage developed in the output of the phase detector 35 is impressed upon a reactance device 37. This device may be of a conventional character and is operative to effect a variation of reactance in correspondence with the phase error voltage. The reactance device in turn is coupled to the reference frequency oscillator 17 and thereby controls the phase and frequency of the reference frequency wave in a generally conventional manner.

By referring now to Figure 2 of the drawing, there will now be described an illustrative embodiment of the burst signal separator 30 of Figure 1 in accordance with the present invention. It includes a burst gating electron tube 38 which is coupled by means of a capacitor 39 and a grid resistor 40 to the input terminal 29. As illustrated, the gating tube 38 is of the pentode amplifier type which is biased by means such as the indicated battery 41 so that it operates on a linear portion of its characteristic. The tube, however, is normally inoperative by reason of the fact that there is no potential impressed upon its anode-to-cathode circuit.

For the purpose of momentarily operating the gating tube 38 periodically, its anode is coupled to the cathode of a gate pulse injector tube 42. The cathode circuit of the injector tube includes an impedance device comprising a resistor 43 and an inductor 44. The purpose of the cathode-connected impedance device is to develop operating voltages for impression upon the anode of the gating tube 38 and in this sense the cathode comprises an output electrode of the pulse injector tube 42. The inductor 44 is a component of the impedance device which is predominantly responsive to the subcarrier wave bursts.

The control grid of the gate pulse injector tube 42 is coupled by means including a capacitor 45 and a grid resistor 46 to the control terminal 32 of the burst signal separator. By this means, the gate pulses 34 are impressed upon the control grid of the tube 42 so as to effect a periodic and momentary operation of this tube during the burst intervals. In this sense, the control grid of the tube 42 is an input electrode for the gate pulses 34. The grid circuit of this tube is self biased, as indicated, and the grid resistor 46 is by-passed by a capacitor 47 for the burst frequencies but not for the gate pulses 34.

The gate pulse injector tube 42 normally is inoperative so that, as a consequence, the gating tube 38 also is inoperative. The impression of the gate pulse 34 upon the control grid circuit of the injector tube 42 momentarily renders this tube conducting and thereby effects the development of a positive-going voltage at the cathode of the injector tube. The impression of this positive-going voltage upon the anode of the gating tube 38 effects the development of a wave 48 at the gating tube anode, which serves as an output electrode of the gating tube. The developed wave 48 may be seen to consist of the subcarrier wave burst superimposed upon a pedestal corresponding to the gate pulse. Thus, at this point, it is seen that the subcarrier wave burst is separated from the composite television signal 25. It, however, is combined with a pedestal pulse from which it also is required to be separated.

The pulse injector tube 42, in this embodiment of the invention, is a combination of a cathode follower and a grounded grid amplifier. It functions as a cathode follower in the manner described to effectively transfer the gate pulse 34 to the anode of the gating tube 38 by which to render it operative. Also, by reason of the described by-passed grid circuit of the injector tube 42, it functions as a grounded grid amplifier for the subcarrier wave burst component of the combined burst and pedestal wave 48. The anode circuit of the injector tube 42 includes a load circuit comprising a network 49 which is of a character to be responsive predominantly to the subcarrier wave burst frequency. Accordingly, the burst is amplified by the tube 42 and is developed at the anode thereof which is coupled by means including a capacitor 50 to the output terminal 31. Accordingly, the separated burst 28′ is developed at the output terminal 31.

A somewhat different form of the invention is shown in Figure 3, to which reference now will be made. The composite television signal 25 is impressed upon the input circuit of the gating tube 38 as in the form of the invention shown in Figure 2. Also, the anode of the gating tube is connected by means including a resistor 51 to the cathode of a gate pulse injector tube 52. The injector tube in general is somewhat similar to the combined injector and amplier tube 42 of Figure 2, particularly with respect to its function as an injector of the gate pulses 34. In this case, however, the impedance device connected to the cathode of the injector tube 52 may consist simply of a resistor 53. Since the tube 52 is not required to operate as an amplifier of the subcarrier burst, it is not necessary to by-pass the grid resistor 46 for burst frequency. Also, the anode may be connected directly to a source of positive potential, as indicated.

The gate pulse injector tube 52 is momentarily rendered conductive under the control of the gate pulse 34 so as to impress a suitable potential of positive polarity upon the anode of the gating tube 38 as in the form of the invention shown in Figure 2. Accordingly, a composite wave 48 including the subcarrier wave burst superimposed upon a pedestal corresponding to the gate pulse is developed at the anode of the gating tube 38.

In this embodiment of the invention, a separate subcarrier wave burst amplifier is used. The amplifier includes an electron tube 54 having an input circuit including its control grid coupled by means including a capacitor 55 and a grid resistor 56 to the anode of the gating tube 38. The anode of the amplifier tube 54 is provided with a load circuit including a resistor 57 and is coupled by means including a capacitor 58 to the output terminal 31.

The amplifier tube 54 is self-biased so as to be effectively non-conducting for signals impressed upon its input circuit having amplitudes less than the amplitude of the subcarrier wave bursts which are superimposed upon the gate pulse pedestals as represented in the wave 48. In this manner, the tube 54 operates as a peak amplifier and responds only to the subcarrier wave bursts so that the separated bursts 28' are developed at the output terminal 31.

It is seen from the foregoing description of a number of illustrative embodiments of the invention that there is provided a relatively simple apparatus by means of which to separate the subcarrier wave bursts from a composite color television signal. Such apparatus has a relatively high degree of noise immunity by reason of the fact that the separator is rendered operative only during burst intervals. It, therefore, is not susceptible of false operation by noise or other extraneous signal effects at times other than the reception of the burst synchronizing signals. Furthermore, the apparatus, in accordance with the present invention, is of such a character that it inherently suppresses any transients which may result from the gating operation.

It, furthermore, is apparent from the foregoing description that such apparatus may employ different types of amplitude discriminating apparatus for segregating the subcarrier wave bursts from any gating pulse pedestals with which they may be combined as a result of the gating operation. A separate peak amplifier may be used as an amplitude discriminator for this purpose as indicated in the apparatus of Figure 3. Furthermore, the burst separator apparatus may be even more simplified by employing a single tube for the dual purpose of injecting gate pulses and for amplifying, on an amplitude discriminating basis, the pedestal-superimposed subcarrier wave bursts.

The nature of the invention having been set forth in the foregoing disclosure, its scope is pointed out in the appended claims.

What is claimed is:

1. In color television system employing a composite signal including a luminance video signal, a chrominance video signal-modulated subcarrier wave and periodic color synchronizing signal bursts of unmodulated color subcarrier wave, apparatus for segregating said subcarrier wave bursts comprising, a normally inoperative burst gating electron tube having input and output electrodes, means impressing said composite signal upon said burst gating tube input electrode, a normally inoperative gate pulse injector electron tube having input and output electrodes, an impedance device connected to said gate pulse injector tube output electrode to develop operating voltages in response to the operation of said gate pulse injector tube, a source of gate pulses coincident with said subcarrier wave bursts, means coupling said gate pulse source to said gate pulse injector tube input electrode to periodically render said gate pulse injector tube operative, means coupling said impedance device to said burst gating tube output electrode in such a manner as to develop across said impedance device and at said burst gating tube output electrode subcarrier wave bursts superimposed upon pedestals corresponding to said gate pulses, and amplitude discriminating means coupled to said burst gating tube output electrode to develop said segregated subcarrier wave bursts from said pedestals.

2. Color television subcarrier wave burst segregating apparatus as defined in claim 1 wherein, said burst gating and gate pulse injector tube input electrodes are control grids, said burst gating tube output electrode is an anode, and said gate pulse injector tube output electrode is a cathode, said composite signal being of negative polarity and said gate pulses being of positive polarity.

3. Color television subcarrier wave burst segregating apparatus as defined in claim 1 wherein, said impedance device includes a component predominantly responsive to said subcarrier wave bursts.

4. Color television subcarrier wave burst segregating apparatus as defined in claim 3 wherein, said gate pulse injector tube output electrode is a cathode, said gate pulse injector tube also having an anode, and said amplitude discriminating means includes a network responsive to said subcarrier wave bursts coupled to said gate pulse injector tube anode.

5. Color television subcarrier wave burst segregating apparatus as defined in claim 1 wherein, said amplitude discriminating means includes an amplifier electron tube biased for response to peaks for said subcarrier wave bursts.

6. Color television subcarrier wave burst segregating apparatus as defined in claim 5 wherein, said burst gating tube output electrode is an anode, and said peak amplifier tube has a control grid input electrode coupled to said burst gating tube anode.

References Cited in the file of this patent

UNITED STATES PATENTS 2,653,187 Luck ---------------- Sept. 22, 1953